C. H. Phelps.
INVENTOR.

BY Lacy & Lacy,
ATTORNEY.S

Nov. 29, 1932.   C. H. PHELPS   1,889,490
TOOL FOR MEASURING CAMBER OF WHEELS AND CASTER AND KING PIN TILT
Filed Aug. 7, 1928   2 Sheets-Sheet 2
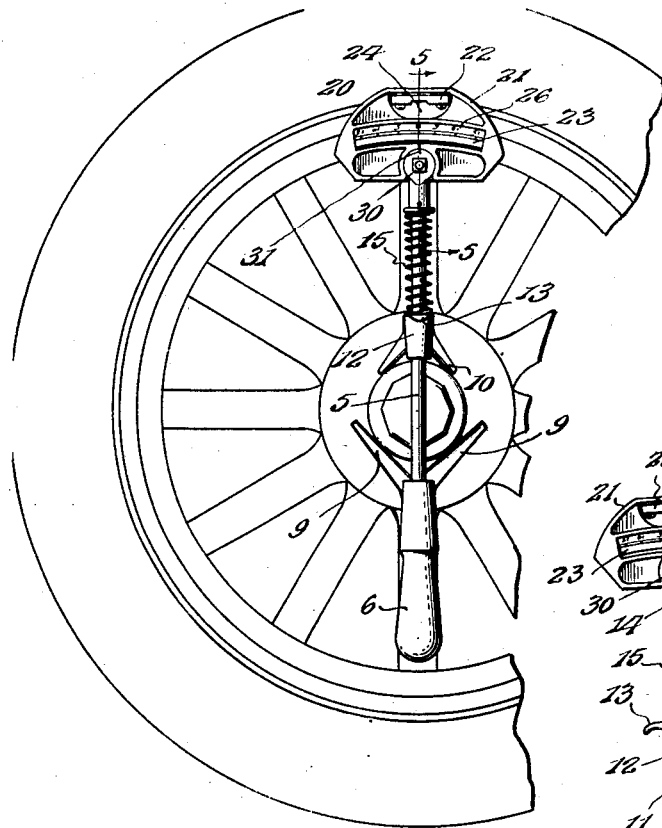
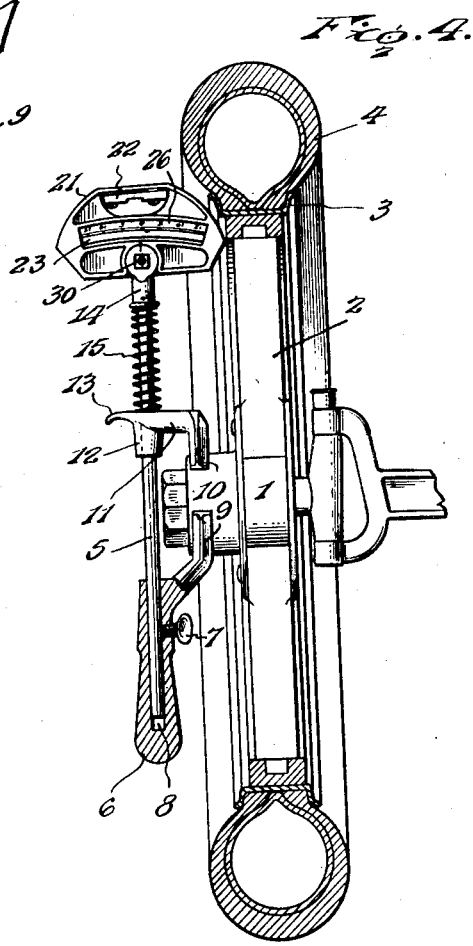
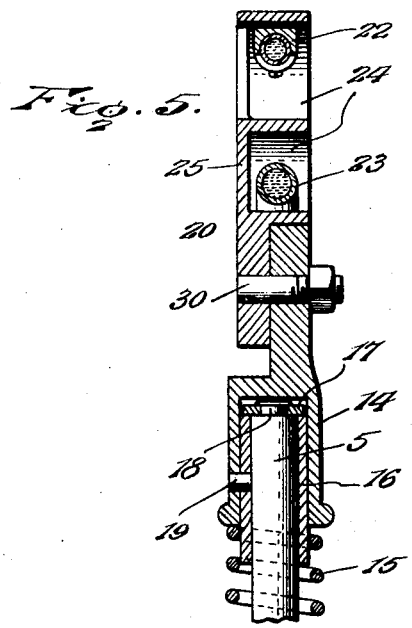
C. H. Phelps.
INVENTOR.
BY *Lacy & Lacy*
ATTORNEY.

Patented Nov. 29, 1932

1,889,490

UNITED STATES PATENT OFFICE

CLYDE H. PHELPS, OF BINGHAMTON, NEW YORK, ASSIGNOR TO THE REISS MANUFACTURING COMPANY, OF KOKOMO, INDIANA, A CORPORATION OF INDIANA

TOOL FOR MEASURING CAMBER OF WHEELS AND CASTER AND KING-PIN TILT

Application filed August 7, 1928. Serial No. 298,006.

This invention relates to gages and has special reference to tools for measuring the camber or pitch of a wheel as well as caster and king pin tilt. The steering wheels of automobiles are generally set at an inclination or pitch and while there is an approximate uniformity of the pitch in the trade each manufacturer adopts a pitch or degree of inclination which he deems most desirable. It is, of course, desirable to determine accurately whether the wheel is originally set at the selected pitch and whether, after use, it has maintained the set pitch or has departed therefrom, and the present invention provides a very simple and efficient tool by the use of which the pitch of the wheel may be accurately determined. The invention is illustrated in the accompanying drawings and will be hereinafter first fully described and then more particularly defined in the appended claims.

In the drawings:

Fig. 3 is a similar view showing the wheel given one half a revolution to bring the meter or head of the tool to the high point of the wheel;

Fig. 4 is a vertical section showing the tool head turned at a right angle to the position shown in Fig. 3 so as to permit a reading of the degree of inclination or camber, and Fig. 5 is an enlarged detail section on the line 5—5 of Fig. 3.

Figure 1:
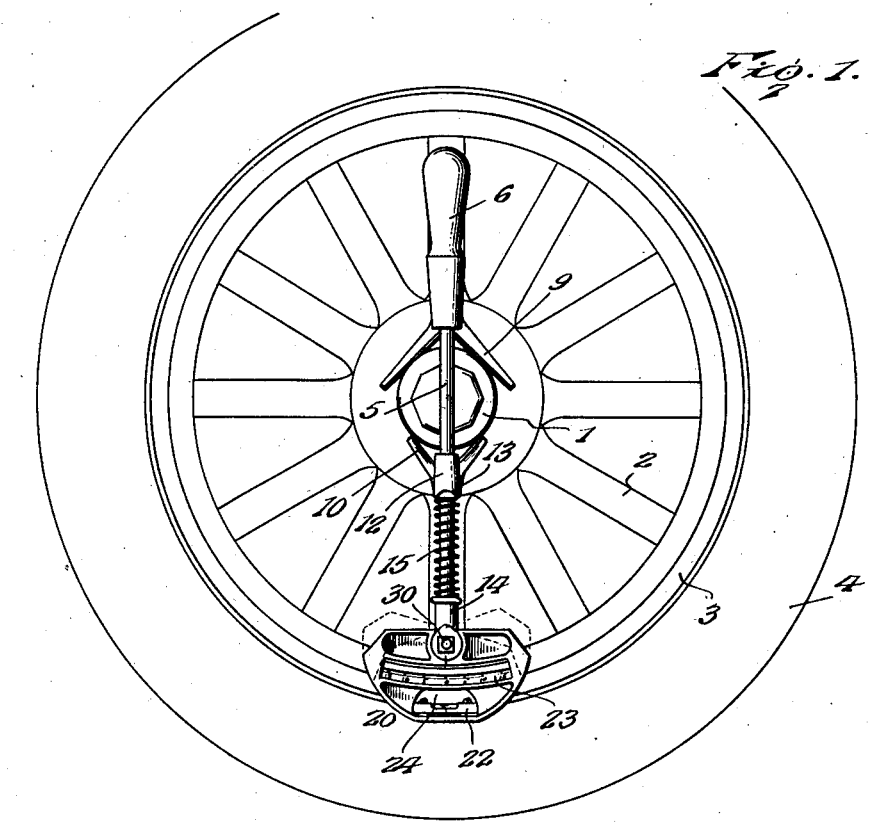
Figure 1 is a side elevation of a wheel having my tool applied thereto showing the initial setting of the tool.

The wheel may be of any approved construction and includes a hub 1, spokes 2, rim 3 and tire 4.

The gage of my invention includes a shank 5 having a handle 6 fitted on one end and secured in a set position on the sank by a set screw 7, the handle being constructed with a socket 8 receiving the end of the shank, as clearly shown in Fig. 4. From the inner end of the handle 6, there extends a fork 9 which has its stem projecting laterally with respect to the handle and its branches disposed parallel with the shank whereby it is adapted to seat upon the end of the hub with the shank extending diametrically across the hub and at a right angle to the spindle or axle upon which the hub is rotatably mounted. Cooperating with the fork 9 is a second fork 10 which is adapted to engage the hub in the same manner that the fork 9 engages the same but at a point diametrically opposite said fork 9. The fork 10 has a body member 11 projecting at an angle to the fork and equipped with a sleeve or collar 12 which encircles the shank 5 and is slidable along the same, said sleeve or collar being provided with a thumb piece 13 whereby it may be easily withdrawn from engagement with the hub when the tool is to be released. The end of the shank remote from the handle 6 is swiveled within a socket 14 and an expansion spring 15 is disposed around the shank between said socket and the sleeve or collar 12 so that it yieldably holds the fork 10 in engagement with the hub, as will be understood upon reference to the drawings. While the particular construction of the swiveled connection between the socket 14 and the shank 15 may be varied within a moderately wide range of details, I have illustrated a very convenient and inexpensive structure which includes a bushing 16 fitting around the end of the shank and a washer 17 bearing against the end of the shank and the end of said bushing, the end of the shank being formed with a tenon or stud 18 which passes through the washer and is upset against the same whereby the shank may rotate within the bushing and the washer but is prevented from sliding out of the same. The bushing is secured within the socket 14 by a pin 19, as clearly shown. Pivotally attached to the outer end of the socket 14 is the meter or measuring head 20 which consists essentially of a casting or body of flat form having parallel sides and having its outer edge arcuate, as shown at 21, whereby it may fit against a tire or rim. Adjacent the center of the arcuate edge of the head is secured a spirit level 22 and between said level and the pivot of the head, there is secured a second spirit level or inclinometer 23, the level 22 being straight, as clearly shown, and the level 23 being preferably arcuate so that when in its final reading position its convex circumference will be uppermost, as in Fig. 4. An opening 24 is formed through the head around the level 22 so that said level may be easily read and an arcuate slot or recess 25 is formed in the head concentric with the level 23 for a similar purpose. The zero point of both levels is alined with the pivot 30 connecting the head with the shank, and tell-tale lines 31 may be provided upon the head and the socket.

Figure 2:
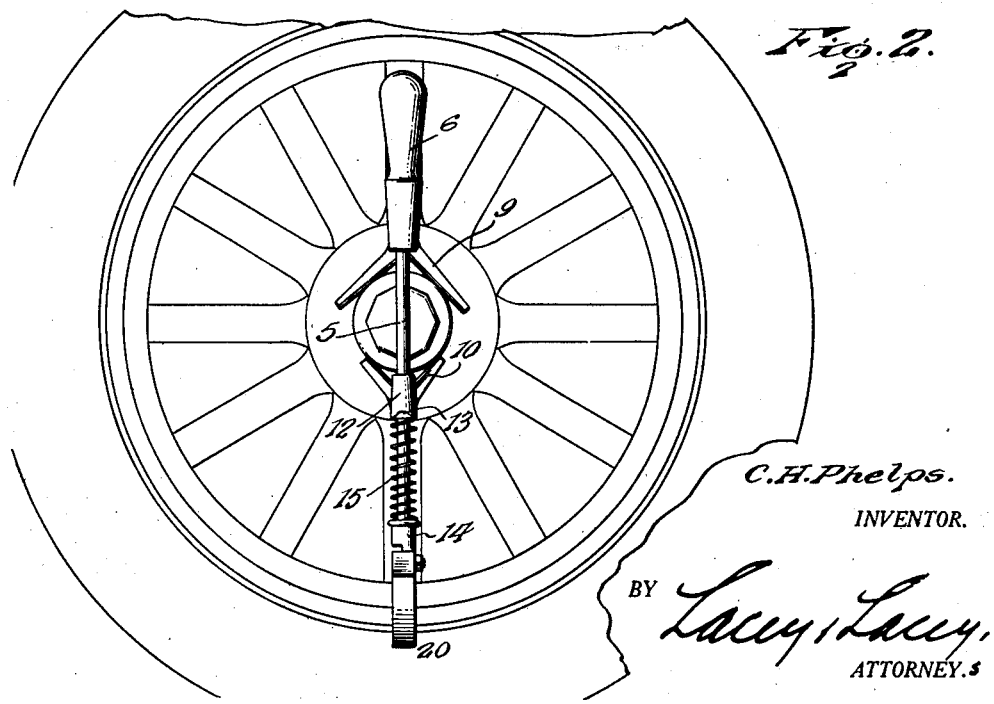
Fig. 2 is a similar view with the gage or meter head disposed at a right angle to the wheel.

In using the tool, the forks or clamping jaws 9 and 10 are engaged about the hub, as shown, so that the tool will assume the position shown in Fig. 1. The engagement of the jaws or forks 9 and 10 with the hub of the wheel is a very simple matter inasmuch as it is necessary merely to rest the fork 9 on the upper side of the hub while holding the fork 10 retracted against the tension of the spring 15 and then, upon release of the fork 10, the spring will at once expand and cause the latter fork to engage the hub so that the tool will be firmly mounted thereon. The car is jacked up just enough to let the wheels turn, using two jacks, one near each end of the axle, and the axle is set exactly level. The meter or measuring head is set parallel with the side of the wheel at the low point thereof, as shown in Fig. 1, which position is indicated when the bubble of the level 22 is at the zero point. The head is then turned about the shank, as shown in Fig. 2, the swivel mounting of the socket 14 on the shank facilitating this action, and then rocked about the pivot 30 until the bubble of the level 22 is again at the zero point, thereby indicating that the head is level and parallel with the axle, whereupon the nut on the pivot bolt is turned home to secure the head against further pivotal movement. The wheel is then turned through one-half of a revolution and the gage, of course, will turn with the wheel inasmuch as it is held firmly thereto and, as it turns, will shift from the horizontal in accordance with the inclination or pitch of the wheel, and the bubble in the level 23 will float from the zero point of the same toward either end to indicate the inclination or camber. If it be desired to note exactly when the head is at the highest point of the wheel, the head may be turned parallel with the wheel, as shown in Fig. 3, but this step is not necessary, and, in actual practice, is generally omitted, the tool turning with the wheel from the position shown in Fig. 2 to the position shown in Fig. 4, to which position it must be turned from that shown in Fig. 3. The swiveled mounting of the socket 14 on the shank permits the head to be turned about the shank without affecting the pivotal adjustment of the head but the wheel and the tool are so balanced that the wheel comes to rest with the head at the highest point and time is saved by not rotating the head about the shank after turning the wheel. The recess 25 is closed by a web back of the tube of the level 23 and upon this web are graduations, indicated at 26, denoting degrees of inclination so that, when the bubble in the level 23 comes to rest, it may be easily noted whether the wheel is on the proper pitch or has, through wear or other cause, acquired a different pitch. The scale is calibrated to degrees of camber which is double the pitch or inclination of either wheel. In addition to the camber test it is feasible with this instrument to indicate caster and also king pin tilt. In indicating caster the instrument is applied to the wheel in the manner described with the gage head at right angles to the wheel, and in the uppermost position, as in Fig. 4. The wheel is then turned in one direction as in steering to a given degree and the gage head rocked upon its pivotal connection until the bubble of the level 23 indicates zero. The wheel is then turned in the opposite direction as in steering to the same degree, whereupon the bubble in the level 23 will automatically indicate the degree of caster.

In making the test for king pin tilt, which is the tilt of the pin in a lateral direction or toward the radiator of the car, the instrument is applied to the wheel as shown in Fig. 3 in which it will be seen that the gage head is parallel with the plane of the wheel and positioned above the axis of the wheel. With this test the wheel is locked from rotating upon its own axis in any suitable way such as by the usual wheel brake. The wheel is then turned to a given degree in one steering direction and the head rocked upon its pivot until the bubble in the level 23 registers zero. The wheel is then turned in the opposite direction as in steering to the same degree, whereupon the bubble in the level 23 will automatically indicate the degree of king pin tilt.

It will be readily noted from the foregoing description, taken in connection with the accompanying drawings, that I have provided an exceedingly simple and compact tool which may be easily applied to a wheel and manipulated readily to accurately disclose the pitch of the wheel. The device may be readily applied to wheels of any diameter and to hubs of any diameter inasmuch as the handle 6 is adjustable longitudinally of the shank 5 and the spring 15 automatically accommodates the setting of the fork or jaw 10 to the diameter of the hub.

Having thus described the invention, I claim:

1. A tool for measuring camber of a wheel mounted upon an axle comprising a shank, means for securing the shank upon a wheel to rotate therewith, a head carried by the end of the shank and turnable about the axis of the shank to lie close to the wheel in a plane parallel with the side of the wheel or in a plane at an angle thereto and adjustable to a horizontal position in either plane, a level on the head for indicating a horizontal position thereof at the low point of the wheel, and an inclinometer on the head operating to show camber of the wheel when the head is turned with the wheel to the high point of the wheel.

2. A tool for measuring camber of a wheel mounted on an axle comprising a shank, a fork adjustable along the shank to engage a wheel hub, a second fork provided with a thumb piece and loosely mounted on the shank to engage a wheel hub at a point diametrically opposite the first-mentioned fork, means yieldably holding the second-mentioned fork in engagement with the wheel hub whereby the fork will be held on the wheel to turn therewith, a head carried by the end of the shank adjacent the rim of the wheel and adapted to lie in a plane parallel with the wheel or in a plane at an angle thereto and adjustable to a horizontal position in either plane, a level carried by the head for indicating a horizontal position thereof at the low point of the wheel, and an inclinometer mounted on the head and operable to indicate camber of the wheel when the head has been turned with the wheel to the high point of the wheel after adjustment at the low point of the wheel.

3. A tool for measuring camber of a wheel mounted on an axle comprising a shank, means for securing the shank upon the side of a wheel to turn therewith, a socket swiveled on an end of the shank, a head pivoted to said socket for adjustment to lie parallel with the side of the wheel or at an angle thereto, a level carried by said head to indicate a horizontal position thereof at the low point of the wheel, means for securing the head in a horizontal position, and an inclinometer also mounted on said head and operating to measure camber of the wheel when the head is at the high point of the wheel after adjustment at the low point of the wheel.

4. A tool for measuring camber of a wheel mounted on an axle comprising a head having an arcuate outer edge whereby it may fit against a tire or rim of a wheel, said head having an opening therethrough adjacent said arcuate edge, means for mounting the head upon the side of a wheel to turn therewith and supporting the head parallel with the side of the wheel or at an angle thereto, a level mounted in said opening through the head whereby to indicate when the head is at the low point of the wheel and is horizontal at said low point when extending at an angle to the wheel, the head being provided with an arcuate recess adjacent said opening, an inclinometer fitted in said recess, and a scale upon the back wall of said recess cooperating with said inclinometer.

5. A tool for measuring camber of a wheel comprising a head, means for pivotally supporting the head on the side of a wheel adjacent the wheel rim to turn therewith, means for adjusting the head to a horizontal position at the low point of the wheel and at a right angle to the wheel, and an inclinometer carried by the head and operable upon turning of the wheel to indicate camber when said head is at the high point of the wheel.

6. A tool for measuring the camber of a wheel comprising a gage, means for pivotally supporting the gage on a wheel to turn therewith, means for adjusting the gage to a horizontal position at one point of the wheel and at an angle to the wheel, and an inclinometer carried by the gage and operable upon turning of the wheel to indicate camber when at another point at the wheel.

7. In an instrument of the character described, a support, means for connecting said support with a wheel to permit the support to rotate with the wheel about the axis thereof, a head pivotally connected with said support, a spirit level carried by said head for adjusting the head to correspond to the horizontal position of the level when the head is at a point in the revolution of the wheel below the axis thereof, and means carried by the head to indicate the inclination of the wheel when said head has been moved with the wheel to a point above the axis of the wheel.

8. In an apparatus for testing the camber of a vehicle wheel, a gage member together with means for applying the same to the vehicle wheel in a definite relation therewith and to rotate with said wheel about the axis of the wheel, means for setting the gage member in a predetermined position at one position of the wheel, and indicating means on said gage member to indicate the inclination of said wheel when the wheel has been rotated to another position.

In testimony whereof I affix my signature.

CLYDE H. PHELPS.